April 9, 1929. J. T. EVANS 1,708,721
FRUIT AND VEGETABLE WASHING AND DRYING MACHINE
Filed June 27, 1927  2 Sheets-Sheet 1

INVENTOR
J. T. Evans.
BY
ATTORNEY

April 9, 1929. J. T. EVANS 1,708,721
FRUIT AND VEGETABLE WASHING AND DRYING MACHINE
Filed June 27, 1927 2 Sheets-Sheet 2

INVENTOR
J. T. Evans.
BY
ATTORNEY

Patented Apr. 9, 1929.

1,708,721

UNITED STATES PATENT OFFICE.

JOSEPH TANNER EVANS, OF BOISE, IDAHO.

FRUIT AND VEGETABLE WASHING AND DRYING MACHINE.

Application filed June 27, 1927. Serial No. 201,848.

My invention relates to fruit and vegetable washers and driers.

An object of this invention is to provide a fruit or vegetable washing and drying apparatus wherein the fruit or vegetables are washed as they are discharged into a hopper which is subsequently rotated to dry the fruit or vegetables by centrifugal action.

The invention further contemplates a washing and drying machine wherein the fruit or vegetables are washed by a suitable washing apparatus such as a spray as the fruit or vegetables are fed into the revoluble hopper but which may be subjected to a bath for further washing if desired.

Further the invention provides a washing and drying machine for fruit or vegetables employing a hopper having hinged side walls, which after the fruit or vegetables have been washed and dried may be swung downwardly constituting chutes for the discharge of the fruit or vegetables from the hopper.

Figure 1:
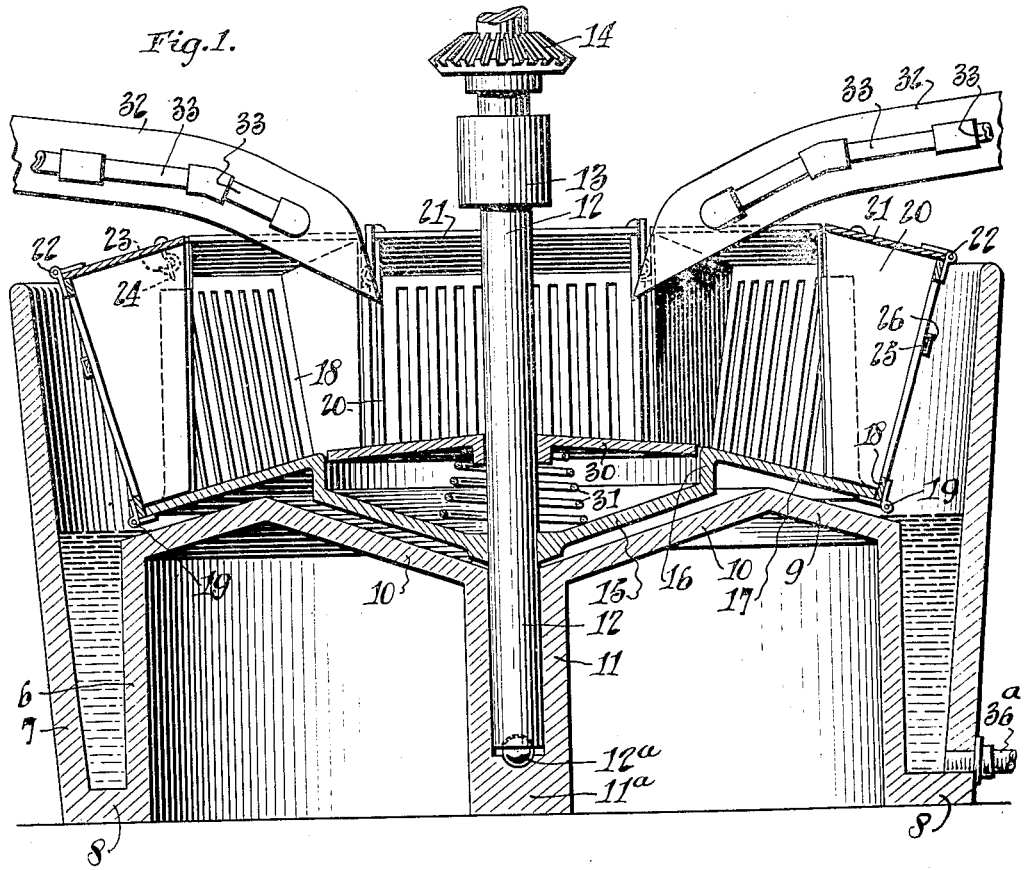
Figure 2:
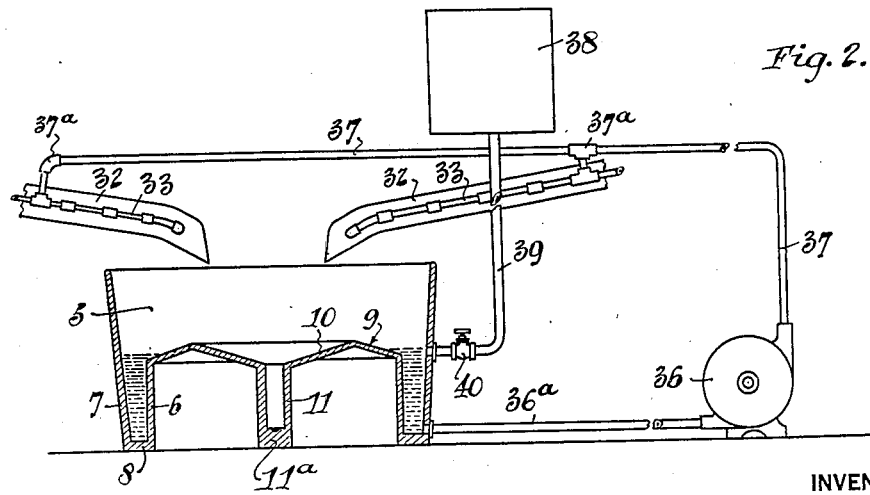
Figure 3:
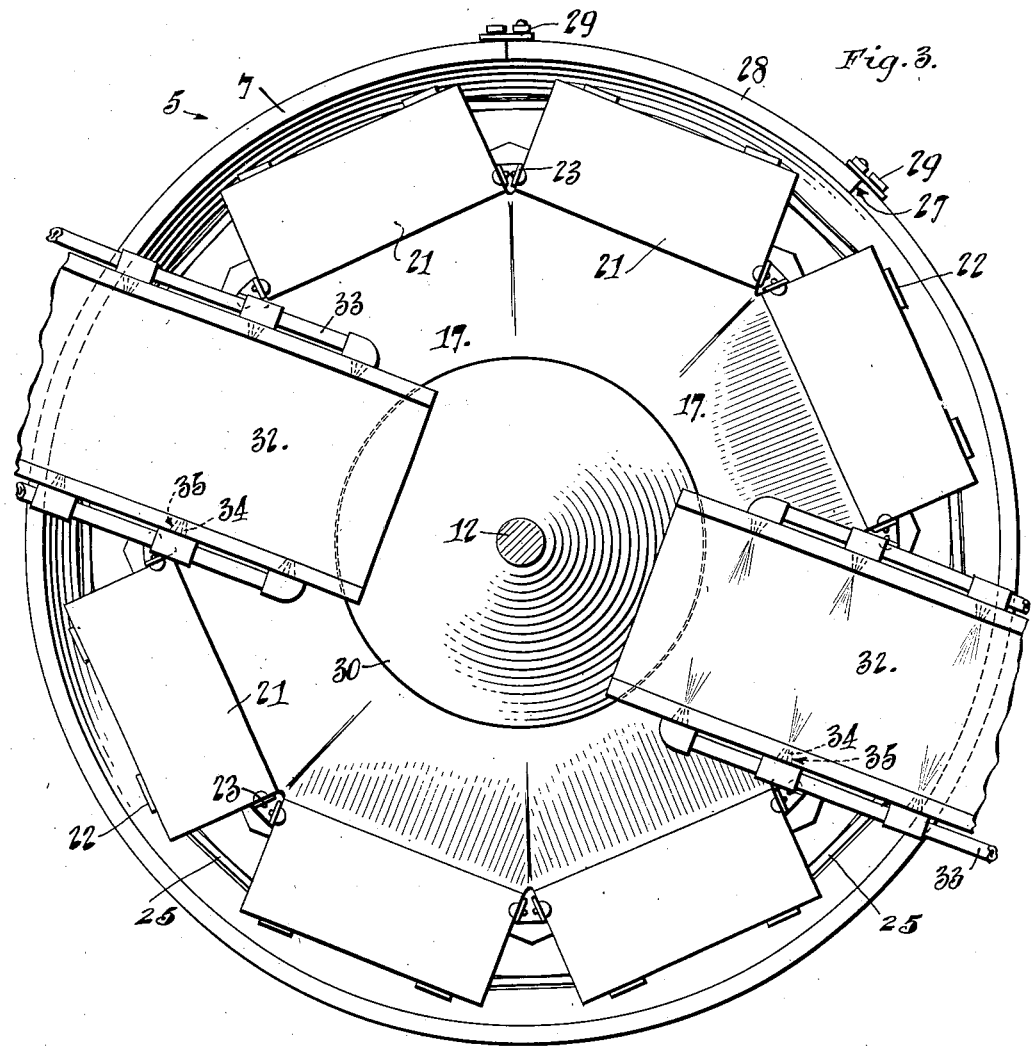
Figure 4:
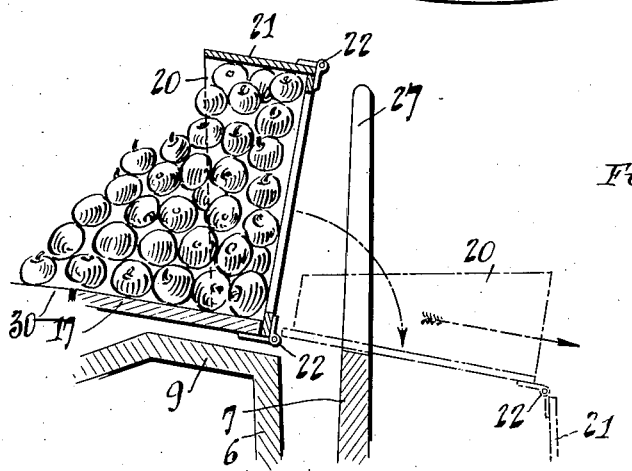

With the preceding and other objects and advantages in mind the invention consists in the combination or elements, construction, arrangement of parts and operations to be herein specifically referred to, claimed and illustrated in the accompanying drawings wherein:

Figure 1 is a vertical sectional view of a fruit or vegetable washing and drying machine constructed in accordance with my invention, Figure 2 is a view partly in vertical section and partly in elevation of the hub or basin and washing apparatus embodied in the invention, Figure 3 is a top plan view, and Figure 4 is a fragmentary sectional detailed view illustrating one of the hopper side walls in broken lines in lowered position to constitute a discharge chute.

Referring to the invention in detail a circular tub or basin 5 is provided having spaced concentric inner and outer walls 6 and 7 connected at their lower edges by a horizontal circular base portion 8. As illustrated in Figures 1 and 2 the inner wall 6 is of less height than the outer wall 5 and has its upper edge integrally connected with the outwardly inclined circular flange or web 9 carried by a flared or inverted frusto-conical shaped bottom 10.

Depending from the under face of the bottom 10 at the center thereof is a sleeve or bearing 11 receiving one end of a vertically disposed shaft 12 whose upper end projects above the upper edge of the outer wall 7 and is journalled in a fixed bearing 13. A drive gear 14 is fixed to the upper end of this shaft and is arranged to be engaged by a suitable power driven gear, not shown. The lower end of the sleeve or bearing 11 is closed as indicated at 11ª and rests upon the ground or floor as the case may be.

To eliminate friction between the lower end of the shaft 12 and the bearing 11 a suitable antifriction bearing ball 12ª interposed between the bottom of the bearing and its lower end.

A revoluble hopper for drying the fruit or vegetables by centrifugal action is provided, and comprises an inverted frusto-conical central bottom portion 15 through which the shaft 12 centrally passes and is secured, and having an upstanding rim 16 which connects an outer downwardly inclined bottom portion 17, the latter extending parallel to the flange or web 9.

Normally projecting vertically from the outer edge of the bottom portion 17 and arranged in the form of a hexagon is a plurality of outwardly inclined side walls 18 having their lower edges attached to the bottom portion 17 by hinges 19. Parallel side walls 20 project laterally from the opposite ends of the side walls 18 and overlie the bottom portion 17. As shown in Figure 3, each pair of adjacent end walls converge inwardly to close the space between the adjacent ends of the side walls 18.

To prevent the fruit or vegetables from passing over the upper edges of the hopper incident to the rotation of the latter, a normally horizontal disposed door 21 is connected to the upper edges of each of the side walls by hinges 22, these doors extending from one end wall to the other.

To secure the doors in horizontal or closed position hooks 23 are carried thereby and are engageable with eyes 24 carried by the adjacent end walls 20. As illustrated in Figure 1 each of the side walls is provided with spaced longitudinally extending slots 24ª throughout their length through which water is thrown from the fruit and vegetables by the centrifugal action of the rotating hopper.

To normally retain the side walls in vertical position a removable strap 25 embraces these walls and is received in loops 26 on the outer faces of these side walls. In order to remove the fruit or vegetables from the hopper the side walls are adapted to be successively swung downwardly to the position illustrated in Figure 4, to constitute a discharge chute. For this purpose the upper edge of the tub or basin 5 is cut out providing an opening 27 through which the side wall extends and is supported in discharging position. A removable panel or sector 28 is provided for normally closing this opener 27 and is retained in the latter by detachable fastenings 29 carried by the ends of the panel and the adjacent walls of the tub or basin 5.

To assist the centrifugal action of the hopper in moving the fruit or vegetables towards the side walls 18 and to cushion the latter as they are fed into the hopper, a circular follower or plate 30 slidably mounted on the shaft 18 and cushioned by an expansible coil spring 31 encircling the shaft and engaging the center of the portion 15, is provided. This plate or follower 30 is of sufficient diameter as to extend to the rim 16 and consequently exerts a pressure on the objects at the center of the hopper, urging them outward.

To wash the fruit or vegetables as they are discharged into the hopper oppositely extending inclined chutes or troughs 32 are supported above the hopper with their discharge ends arranged directly above the spring pressed follower 30. Extending along the sides of each of the chutes 32 are water conducting pipes or conduits 33, each of which is provided with a plurality of laterally projecting nozzles 34 extending through openings 35 in the sides of the chutes, to play upon the fruit or vegetables as they advance through the chutes to the hopper.

A suitable pump 36 communicates with the tub or basin 5 at its lower end by way of an inlet pipe 36ª and leading from the outlet of this pump is a pipe line 37 which extends horizontally across the chutes 32 and has communication with the pipe 33 by unions 37ª. A water supply tank 38 is supported in any convenient manner above the tub or basin 5 and has an outlet pipe 39 communicating with the tub or basin above the pipe 36 and is equipped with a control valve 40.

It will be observed that the water in the tub or basin is in constant rotation as it is immediately returned to the latter by way of the chutes 30.

However, the water supply may be readily replenished by opening the valve 40 to the storage tank 38. Normally the tub or basin 5 is filled to the level indicated in Figures 1 and 2 but should a further washing of the objects be necessary the tub or basin is filled to a higher level and the hopper rotated in the bath for a sufficient period of time.

With the tub or basin filled to the level indicated in Figures 1 and 2 and assuming the fruit or vegetables have been washed, the hopper is rotated at a high rate of speed throwing moisture or water from the contents thereof by the centrifugal action developed by the rotation of the hopper and thus effectively drying the fruit or vegetables.

I claim:

1. In a washing and drying machine, a discharge chute through which objects are fed, means for washing the same as they are fed through the chute, and a revoluble hopper arranged to receive the washed objects from the chute and operable to throw water deposits therefrom by centrifugal action.

2. In a washing and drying machine, a liquid receiving receptacle, a revoluble hopper supported therein above the liquid level thereof, a discharge chute for feeding objects into the hopper, a washing apparatus arranged to wash the objects as they are fed through the chute and obtaining its liquid supply from the liquid contained in the receptacle.

3. In a washing and drying apparatus, a receptacle, a revoluble hopper supported therein, means above the hopper for conveying objects to the latter and a washing apparatus for washing the objects after they are conveyed into the hopper, the centrifugal force developed incident to the rotation of the hopper serving to throw water from the washed objects to dry the same.

4. In a centrifugal fruit or vegetable drier a rotating hopper including a bottom, a plurality of normally vertically disposed side walls hinged thereto and provided with water outlet openings, laterally extending walls carried by the side walls, a hinged top carried by each side wall means for rotating the hopper whereby to throw water from the objects contained therein by the centrifugal force developed by the rotation of the hopper, any one of the side walls being arranged to be swung downwardly to constitute a chute for the discharge of dried objects from the hopper.

5. In a fruit or vegetable drier, a hopper rotatable about a vertical axis and having side walls provided with slots for the escape of water thrown from the contents thereof incident to the centrifugal action of the hopper, and a resilient cushioned follower arranged centrally of the bottom of the hopper and normally urging the objects contained therein toward the side walls.

6. In a centrifugal drier a vertically arranged hopper having centrally depressed bottom portions and a downwardly inclined outer bottom portion, upstanding side walls carried by the outer bottom portion and having water discharge openings therein, and a resiliently urged follower arranged above the depressed bottom portion and normally disposed at an elevation to urge the objects on to the inclined bottom portion.

7. An apparatus of the character described comprising a receptacle having spaced concentric inner and outer walls, a bottom connecting the upper edges of the inner wall, a vertically disposed bearing depending from the bottom, a vertical shaft revolubly supported in the bearing, a hopper rotable with the shaft and supported above the bottom arranged to receive moistened objects and expel the moisture therefrom by centrifugal force.

8. An apparatus of the character described comprising a liquid receptacle including spaced concentric side walls connected at their lower ends and the innermost wall of which being of less height than the outer wall, a bottom connected with the upper edges of the inner wall and a revoluble hopper supported above the bottom to receive moistened objects and expel the moisture therefrom by centrifugal action.

9. An apparatus of the character described comprising a liquid receptacle including spaced concentric side walls connected at their lower ends and the innermost wall of which being of less height than the outer wall, a bottom connected with the upper edges of the inner wall, and a revoluble hopper supported above the bottom to receive moistened objects and expel the moisture therefrom by centrifugal action, conveyor means above the hopper, spray nozzles along the conveyor means to play upon the objects being conveyed to the hopper, and a pump communicating with the receptacle and spray heads for conducting liquid from the pump to the spray head.

10. In combination a receptacle having openings at one side, a removable panel normally closing the opening, a vertically arranged revoluble hopper in the receptacle to dry objects placed therein by centrifugal action and including a plurality of normally vertically disposed substantially channel-shaped members hingedly supported and anyone of which being capable of being swung to extend through the opening after the removal of the panel to constitute a discharge chute for the removal of the hopper contents.

11. In a drying machine, a revoluble table inclined from its center to its edges, foraminated upstanding members attached to the table at its edge to prevent objects from rolling therefrom, and a resiliently raised follower arranged at the center of the table to cushion the objects as they are discharged onto the table.

12. In a drying machine, a rotatable hopper having a central depression, and cushioned plate overlying the depression to eliminate shock and incident damage of the objects as they are discharged into the hopper.

JOSEPH TANNER EVANS.